(12) United States Patent
Halfmann et al.

(10) Patent No.: US 7,656,962 B2
(45) Date of Patent: Feb. 2, 2010

(54) METHOD FOR TRANSMITTING SIGNALS IN A RADIO COMMUNICATION SYSTEM

(75) Inventors: Rüdiger Halfmann, Otterberg (DE); Matthias Lott, Neuried (DE); Egon Schulz, München (DE)

(73) Assignee: Siemens Aktiengesellschaft, Munich (DE)

( * ) Notice: Subject to any disclaimer, the term of this patent is extended or adjusted under 35 U.S.C. 154(b) by 415 days.

(21) Appl. No.: 10/546,705

(22) PCT Filed: Feb. 20, 2004

(86) PCT No.: PCT/EP2004/001707

§ 371 (c)(1),
(2), (4) Date: Aug. 24, 2005

(87) PCT Pub. No.: WO2004/075437

PCT Pub. Date: Sep. 2, 2004

(65) Prior Publication Data
US 2006/0165193 A1    Jul. 27, 2006

(30) Foreign Application Priority Data
Feb. 24, 2003    (DE) .............................. 103 07 809

(51) Int. Cl.
*H04L 27/00* (2006.01)

(52) U.S. Cl. .................. 375/295; 375/132; 375/133; 375/134; 370/319; 370/320; 370/321; 370/322; 370/323; 370/337; 370/344; 370/341

(58) Field of Classification Search .............. 375/295, 375/132–134; 370/319–322, 337, 344, 347
See application file for complete search history.

(56) References Cited

U.S. PATENT DOCUMENTS

| 5,537,434 | A  | * | 7/1996  | Persson et al. ............. 375/134 |
| 7,142,580 | B1 | * | 11/2006 | Balachandran et al. ...... 375/132 |

FOREIGN PATENT DOCUMENTS

WO    98/44657    10/1998

OTHER PUBLICATIONS

Yu-Chee Tseng, et al., Power-Saving Protocols for IEEE802.11-Based Multi-Hop Ad Hoc Networks, IEEE Infocom Feb. 2002, pp. 200-2008.

Matthias Lott, et al., A Frequency Agile Air-Interface for Inter-Vehicle Communication, IEEE Infocom Jul. 2003, pp. 507-514.

(Continued)

*Primary Examiner*—Curtis B Odom
(74) *Attorney, Agent, or Firm*—Staas & Halsey LLP

(57) ABSTRACT

The invention relates to a method for transmitting signals in a radio communication system consisting of at least two frequency signal-transmitting channels. At least the first ($f_{coord}$) of said frequency channels is used for organizing radio resources, and at least the second ($f_i$) of the frequency channels is used for transmitting signals between the stations of the system where the signal transmission is carried out by the frequency channels from/in a direction of said stations in conformity with a predefined temporal pattern (P1, P2, P3).

9 Claims, 2 Drawing Sheets

OTHER PUBLICATIONS

Sakata et al., "Performance Evaluation Of Autonomous Decentralized Vehicle-Grouping Protocol For Vehicle-To-Vehicle Communications", Department of Communications and Computer Engineering 2000, Kyoto University, pp. 153-157.

European, Telecommunications Standards Institute, "Broadband Radio Access Networks (BRAN); Hiperlan Type 2 Functional Specification, Data Link Control (DLC) Layer, Part 4—Extension for Home Environment", Apr. 2000, pp. 1-116.

* cited by examiner

METHOD FOR TRANSMITTING SIGNALS IN A RADIO COMMUNICATION SYSTEM

CROSS REFERENCE TO RELATED APPLICATIONS

This application is based on and hereby claims priority to International Application No. PCT/EP2004/001707 filed on Feb. 20, 2004 and German Patent Application No. 10307809.6 filed on Feb. 24, 2004, the contents of which are hereby incorporated by reference.

BACKGROUND OF THE INVENTION

The invention relates to a method for transmitting signals in a radio communication system, in particular in a mobile telephone system.

Future radio communication systems will support very high data rates in order to be able to operate multimedia applications with the necessary quality of service. A continued increase in subscriber numbers is also to be anticipated such that further frequency bandwidths must be developed for use by radio communication systems. In order to make efficient use of these frequency bandwidths however radio communication systems need to operate over a large frequency range.

Various methods are used in radio communication systems for segmenting resources and multiplexing. In addition to Time Division Multiplexing (TDM) and Code Division Multiplexing (CDM), various frequency channels are created through Frequency Division Multiplexing (FDM). The FDM method involves segmenting a wide frequency spectrum into many separate frequency channels, each with a narrow bandwidth, within the frequency range, thus creating a frequency channel grid defined by the gaps between the carrier frequencies. Advantageously this allows a plurality of subscribers on different frequency channels to be served simultaneously and resources to be better tailored to individual subscriber requirements. A sufficient distance between frequency channels ensures that interference between the channels can be reduced and controlled.

In order for the narrow band frequency channels to be used by a corresponding access method known as FDMA (Frequency Division Multiple Access), the transmitter and receiver must each select a corresponding carrier frequency in a coordinated manner. Before using the corresponding resource, i.e. the radio channel, continued checks need to be made to establish whether the selected resource is not already being used by other stations. The resource is then reserved, if necessary the reservation being communicated to other potential stations so that these stations do not subsequently access the resource at the same time and cause collisions. The challenge here is to optimize the efficient use of these frequencies, using few resources and as far as possible only one transmitter and receiver (transceiver) for each terminal. A further constraint is that all stations have equal rights i.e. no station assumes a control function for assigning the frequency channels via a plurality of stations. In particular in self organizing networks and networks without an infrastructure, so-called ad-hoc networks, stations with equal priority frequently perform the same algorithms and protocols. A known example for such networks is the local wireless network (Wireless LAN) according to the IEEE 802.11.standard.

If stations in networks such as these are not informed about the use of frequency channels because the appropriate information is not collated and distributed via a central station, a station will be unable to decide which frequency channel it should propose or select for communicating with another station. Also, a station will not know when another station is ready to receive and on which frequency. Consequently, a station would generally be unable to establish a connection with another station if both were free to select the frequency channels. Also, a distribution service (broadcast) on one frequency would only reach one part of the station which happened to be ready to receive on this frequency.

The requirement is therefore to coordinate the use of these orthogonal resources. If a particular frequency is to be used for this purpose, at fixed, predetermined times i.e. all stations are ready to receive on this frequency, then the frequencies which exist alongside them cannot be used. These resources would then be unused and unavailable for these stations.

In existing cellular mobile telephone systems, the frequencies are allocated to the mobile stations (MS) located within one radio cell of the base station via a central station, the base station (BS). With GSM (Global System for Mobile Communication) for example, one central frequency channel per radio cell is used for transmitting general information used by the mobile stations for determining the frequency channel for logon and request of resources. If a mobile station wishes to transmit data, it requests the data from the base station on the frequency channel it knows. The base station then notifies the mobile station of the appropriate carrier frequency on which it can communicate with the base station. The allocation and management of available resources is controlled centrally in a Base Station Controller (BSC) subordinating the base station and signaled from the base station. The same applies to third generation UMTS (Universal Mobile Telecommunication System) systems which also use a base station to signal the frequency allocation according to this central principle.

Because of the central control, this approach cannot be used in a decentrally organized system without a central entity. Other systems, such as for example WLAN systems (Wireless Local Area Networks) according to the HIPERLAN Type 2 Standard known for example from the ETSI/BRAN document "Broadband Radio Access Networks (BRAN); HIPERLAN Type 2 Functional Specifications Data Link Control (DLC) Layer; Part 4—Extension for Home Environments., draft DTR/BRAN-0020004-4, ETSI, Sophia Antipolis, France, April 2000 or according to the IEEE 802.11 standard, use only one carrier frequency for communicating. Switching to a different frequency serves to avoid interference. If a new, usable carrier frequency is found, all stations transmit and receive on this frequency. In HIPERLAN/2 this method is known as Dynamic Frequency Selection (DFS). A simultaneous needs-based use of several frequencies by any stations to increase the total possible capacity of the system or of an individual connection is however not provided. Consequently, the maximum date rate is limited to one frequency channel.

Similar to the DFS method according to the HIPERLAN/2 Standard, a system is proposed in the document by R. Sakata, K. Naha, H. Murata, S. Yoshida Performance Evaluation of Autonomous Decentralized Vehicle-grouping Protocol for Vehicle-to vehicle Communications, in Prov. IEEE VTC, Boston, Mass., Sep. 24-28, 2000 pp 153-157, in which vehicles form groups using different frequencies. In this method, neighboring vehicles share the same carrier frequency. By measuring the active frequency channels, it is possible to participate simultaneously in a plurality of groups and switch groups to take account of the changing network topologies. This assumes that, generally speaking, only one frequency is used for exchanging data whereas the other frequencies only receive so as to prepare for occupancy and a possible change of frequency. In order to be able to receive simultaneously on other frequencies, it is proposed that two transceivers be used, one for data exchange and the second for measuring other potential frequencies. The use of a plurality of available frequencies for communicating with neighboring stations for the exchange of data is however not described, even here.

The DECT cordless telephone standard (Digital Enhanced Cordless Telephone) specifies a flexible use of resources including different frequency channels. The method by which the resources are used is called Dynamic Channel Selection (DCS). Although in this system, when in so-called "Basic Mode", one base station has exclusive control over resource allocation, the relaying of data packets is supported. To achieve this, as in a distributed, decentralized system, resource availability is checked and occupied.

For each carrier frequency, DECT specifies a frame with 24 time slots, 12 time slots being used for the downlink and 12 for the uplink with a fixed allocation in the Time Division Duplex method (TDD), see FIG. 1.

DECT is thus an FDMA/TDMA/TDD system in which 10 carrier frequencies can generate up to 120 communication (bearer) channels. Before setting up a connection, a station measures different communication channels. The resulting Received Signal Strength Indicator (RSSI) is recorded in a table. All channels with a signal level lower than the lowest level (−93 dBm) are classified as "quiet" and may be used to set up a communication channel. The upper threshold, which is classified as "busy" defines the range of busy channels and is variable. As a rule the upper threshold is set to −33 dBm. Channels with signal levels in excess of this threshold may not be used for setting up a communication channel.

The maximum number of channels in a cell depends on the number of base station transceivers. If only one transceiver is available per base station, only one mobile station per time unit (time slot) can be operated. A free allocation of time slots for direct communication between mobile stations in parallel with the communication between a mobile station and base station is not defined in greater detail. DECT, however, supports this "walkie-talkie" mode. As soon as a mobile station with only one transceiver occupies a channel, the remaining frequency channels parallel to this time slot are marked as so-called blind slots, see FIG. 1. Stations may neither transmit nor receive on these blind slots and conduct measurements of the received signal level. Depending on how quickly the stations are able to switch from transmitting to receiving and vice versa (Transceiver Turn-Around), time slots before and after are also to be marked as blind slots. The base station periodically transmits control information to all mobile stations via the currently busy time slots. This information allows the mobile stations to measure the remaining unoccupied time slots which can be used as potential candidates for a future communication between the base station and mobile station. Owing to the base station's special role, the methods described and implemented in the DECT system are not applicable to a target system in which no central entity exists but in which simultaneous use of time slots on different frequencies is to be facilitated.

SUMMARY OF THE INVENTION

One possible object of the invention is thus to enable a plurality of available frequency channels to be used in a decentrally organized system as efficiently as possible. The inventors propose a radio communication system having at least two frequency signal-transmitting channels, which uses at least the first of said frequency channels for organising radio resources. The system uses at least the second of the frequency channels for transmitting signals between the stations of the system. Signal transmission is carried out by the frequency channels from/in a direction of said stations in conformity with a predefined temporal pattern.

BRIEF DESCRIPTION OF THE DRAWINGS

These and other objects and advantages of the present invention will become more apparent and more readily appreciated from the following description of the preferred embodiments, taken in conjunction with the accompanying drawing of which.

DETAILED DESCRIPTION OF THE PREFERRED EMBODIMENT

Figure 1:
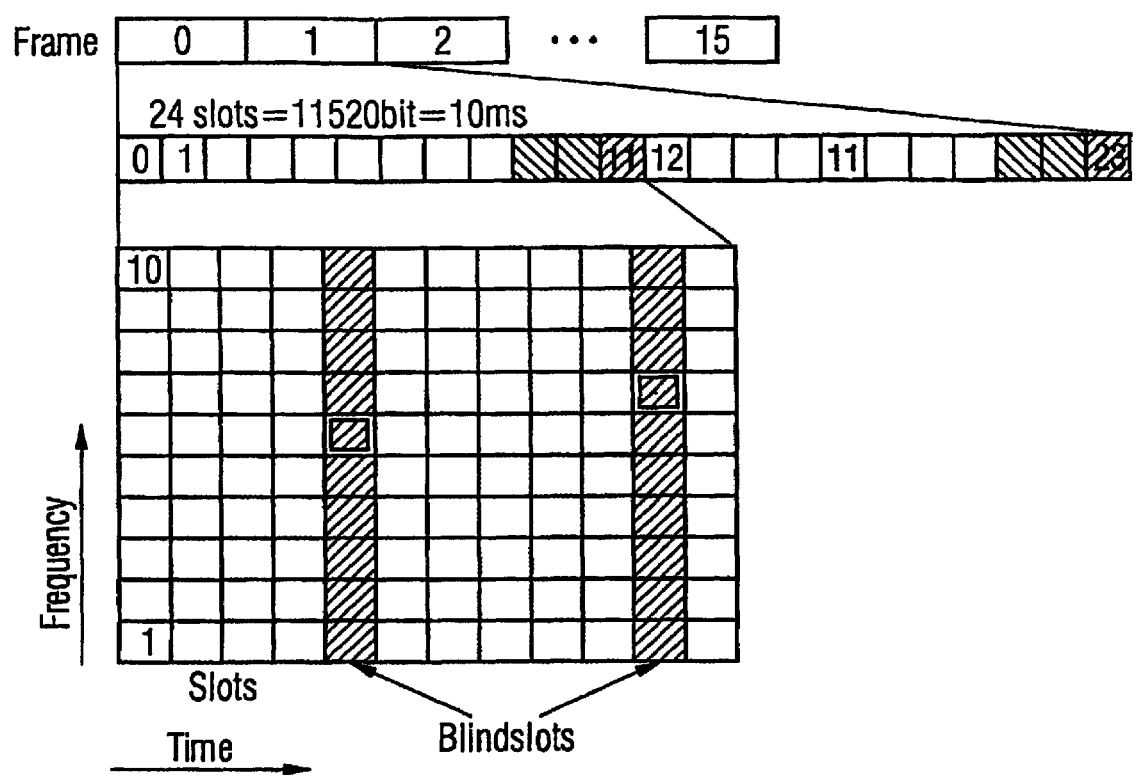
FIG. 1 shows a temporal structure of a known DECT frame.

Reference will now be made in detail to the preferred embodiments of the present invention, examples of which are illustrated in the accompanying drawings, wherein like reference numerals refer to like elements throughout.

The inventors propose that the allocation of resources, in particular the use of different frequencies, be achieved using the FDMA method with periodically recurring control channels. In this way, a station can use all frequency channels during a first time interval, and must switch to a particular frequency during a second time interval. A control channel allocated to this specific frequency serves to ensure a coordinated exchange of the relevant control messages and protocol operations as well as administering the available radio resources, for example in accordance with the so-called Radio Resource Management (RRM).

Figure 2:
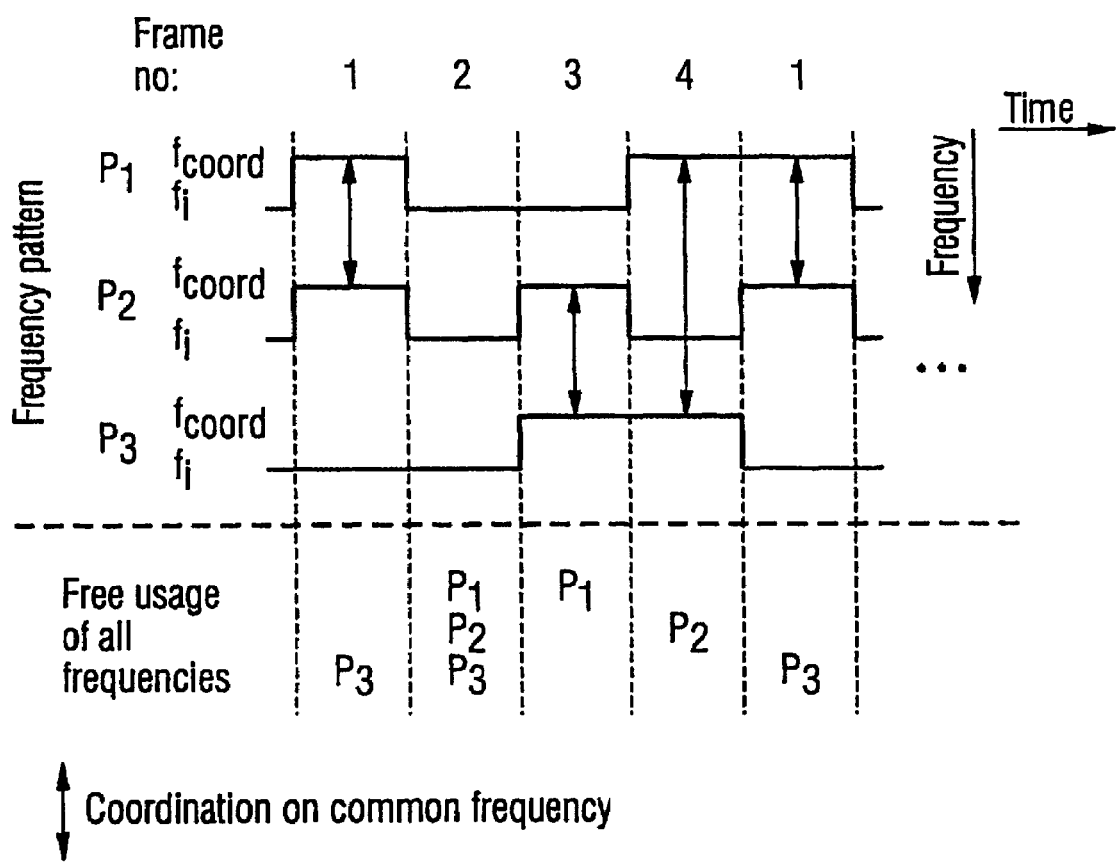
FIG. 2 shows an exemplary frequency selection based on frequency patterns.

The proposed method defines so-called Frequency Patterns as specified for example in FIG. 2. These Frequency Patterns employ a so-called Exchange Phase on the coordination frequency fcoord and a co-called Transmission Phase on one or a number of random carrier frequencies fi, which follow on from each other.

During the exchange phase, a station receives and/or transmits the coordinating frequency fcoord on a fixed frequency. This frequency is known to the stations of a network. On this frequency, for example, a station announces reservation requests, sends out so-called beacons for the network organization and/or transmits relevant or time critical information to neighboring stations.

In the time remaining, the transmission phase, a station can make free use of available frequencies and only needs to take account of or coordinate its own frequency channels selected on a temporal basis when transmitting with other stations. This phase can continue to be used for measuring frequency channels with a view to possible later use.

According to an embodiment of the invention, the phases of the frequency pattern are equidistant in time. This gives rise to at least three frequency patterns with alternating phases and different sequences of the exchange phase and transmission phase as represented in FIG. 2.

If for example a station selects frequency pattern P1, it will start operating on coordination frequency fcoord in frame 1 and then switches for two successive transmission phases, respectively frame 2 and 3, to one or more arbitrary frequencies fi, and afterwards switches back in frame 4 and 1 to the coordination frequency fcoord. In order to integrate the method according to the invention into existing systems, the phases correspond to a respective frame duration which for example in the UTRA TDD standard is 10 ms. The pattern repeats itself after four frames 1 to 4 and the frequency selection procedure starts from the beginning. Stations belonging to other patterns P2 and P3 represented by way of an example, switch to the coordination frequency fcoord at different times or frames, for example for P2 in the first 1 and third frame 3 and for P3 in the third 3 and fourth frame 4. In such a configuration there are common times or frames where stations belonging to different frequency patterns are jointly using the coordination frequency fcoord e.g. frame 1 for the patterns P1 and P2 (coordination on common frequency). It is therefore guaranteed that two frequency patterns always have a common phase within four sequential phases.

According to one embodiment of the invention, it is further proposed that exactly three frequency patterns be used. This guarantees a maximum delay of four frames for the exchange of any data between stations although the stations are free to select and use all frequencies. This means that any station can be reached after no more than four frames, irrespective of which frequency pattern it uses. This is of particular interest if quality of service is to be guaranteed in a radio network. In particular, this is the smallest number of frequency patterns which enables all frequencies to be used at any time. A station can select one of these patterns. The corresponding pattern is selected depending on how many stations have already selected a pattern or how much capacity is still available in the coordination phase and with which stations communication is being attempted. If all transmission resources in a group are occupied by corresponding frequency patterns, another frequency pattern will be selected which may provide additional free resources that exist during the coordination phase of the previously selected pattern. Naturally the invention also supports more than three frequency patterns with the same advantages already described.

Advantages of the proposed method are on the one hand the simplicity of the complexity requirements on the stations' transmitters and receivers (transceivers). As a plurality of frequencies need to be operated, the switching times between frequencies as well as the switching times between transmission and reception and vice versa should be as short as possible. Moreover, only one transceiver per station is required for the stations to be able to use all the frequency channels within radio range simultaneously.

Furthermore advantages also follow from the economy in decoding and resource management. A station only needs to decode the time slot during the coordination phase as it is only at this time that it can assume that other stations are ready to receive and that broadcast messages are being recorded. This means that the occupation of resources and reservation requests can be announced during this time thereby advantageously facilitating the administration of resources.

A further advantage follows from an energy saving implicitly associated with the method. As a station only needs to be ready to receive during the coordination phase, it can switch to a sleep mode for the rest of the time. A comparable method for saving power for only one carrier frequency is described in Y.-C. Tseng, C.-S. Hsu, T.-Y. Hsieh. "Power-saving protocols for IEEE 802.11-based multi-hop ad hoc networks" in Proc. IEEE INFOCOM'02 New York, 23-27 Jun. 2002. This defines a time pattern comprising two phases. During the first phase the station is on standby to receive whereas in the other so-called sleep phase it turns the receiver off so as to save power.

The method is accompanied by an efficient use of available frequency channels. The method permits all frequencies to be used at all times. From a station's perspective, this freedom of choice is only restricted during the coordination phases. As however various different patterns are available, stations can transmit data at any time on any frequency using a corresponding pattern.

The organization of the frames brings about a virtual fragmentation of user groups using different frequencies. If for example different groups of stations are using different frequencies, although all the stations are physically located within the decoding range, the stations are separated as if they could not be reached directly. Although the stations are subdivided into smaller groups and thus have greater transmission capacity available, their availability in the network falls. The broadcast is also virtually fragmented i.e. although all stations could be reached, only some of the stations are receiving. Multicast/broadcast messages therefore need to be transmitted in several parts (fragments) until all stations have received the corresponding information.

As a broadcast is intended to reach as many subscribers as possible, a fragmentation into different groups constantly using different frequencies would run counter to this objective. Communication with subscribers belonging to another group constantly using a particular frequency channel can thus only be achieved by switching frequency and possibly also by expensive routing methods. Complexity would thus be comparable in that some stations were outside the radio range of other stations i.e. it would be comparable with a partially meshed network. At the same time however, the challenges of such a network also need to be managed, such as for example multi-hop transmission. At least one station in each group must belong to two groups in order to communicate between groups. The method defines a coordinated approach in which all stations are able to communicate with each other without changing group and/or a new frequency pattern associated therewith.

A clear frequency pattern is to be recognized with the use of the method. At recurring intervals, a particular frequency is used for a particular duration. Corresponding frequency patterns can be defined in the system standard in order to determine common coordination times. Alternatively, corresponding algorithms or generator polynomes for generating patterns can be defined in the system standard. In order that an exchange between stations with different frequency patterns is made possible, all participating stations will use this common frequency channel after a particular time. In order to limit delays, this duration will for example lie within the range of a MAC frame (MAC—Medium Access Control). During these phases, in which a particular frequency is being used, information for organizing the radio medium is exchanged or signaled as to which frequencies are busy (status information) and which frequencies are to be occupied in future (reservation requests).

One particular feature is the introduction of an FDMA method for the efficient use of a large number of frequency channels at any time, without making any particular demands on the stations' radio hardware. The method will preferably be employed in decentrally organized systems. This involves a station periodically switching between two phases which define a frequency pattern. During one phase, it transmits and receives on a predefined frequency used for organizing the radio medium. During the other phase, a station is free to select any frequency channel. By introducing at least three frequency patterns, it is possible to select any frequency channel at any time depending on which of the possible frequency patterns is chosen.

Initially, to avoid reservation conflicts and to ensure the availability of adequate resources, all the transmission resources for communicating between stations within a group are used during those times which are capable of being used exclusively by this group alone. These times occur if according to the example in FIG. 2, two other groups happen to be exchanging data over the coordination frequency. As far as possible the phase during which all stations are free to use the frequencies is used only for communicating between two groups. The shared coordination phase can also be used for exchanging data between two groups. For multicast and broadcast, that phase is used during which all stations are free to transmit on the frequencies. The method can also be applied in the same manner to centrally organized systems. The advantage then resides in the fact that the central entity need be no more complex than the other stations. This means that the central role, as for example with HIPERLAN/2 or Bluetooth, could be transferred dynamically to any station.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A method for transmitting signals in a radio communication system having at least first and second frequency channels for signal transmission, comprising:

using at least the first frequency channel for organizing radio resources;

using at least the second frequency channel for transmitting signals between stations of the radio communication system;

using a predefined frequency patterns for signal transmission from/to the stations, using frequency channels in a period consisting of a number of consecutive frames, wherein for each frequency pattern, different frames within said period are used for the first and the second frequency channels, and wherein, any two frequency patterns are jointly using the first frequency channel once every period; and choosing a predetermined frequency pattern by a station.

2. The method according to claim 1, wherein stations are assigned station specific patterns for using the frequency channels.

3. The method according to claim 1, wherein the first frequency channel is used to transmit at least one of control messages, information relating to protocol operations and information related to administration of radio resources.

4. The method according to claim 1, wherein the radio communication system is a decentrally organized system.

5. The method according to claim 2, wherein the first frequency channel is used to transmit control messages, information relating to protocol operations and information related to administration of radio resources.

6. The method according to claim 5, wherein the radio communication system is a decentrally organized system.

7. A station of a radio communication system, with the means to perform the method according to claim 6.

8. A station of a radio communication system, with the means to perform the method according to claim 1.

9. The method according to claim 1, wherein at least two different frequencies are used in at least one frame of the frequency pattern of a station, the different frequencies being used for different data.

* * * * *